United States Patent
Kappagantu et al.

(10) Patent No.: US 8,505,699 B2
(45) Date of Patent: Aug. 13, 2013

(54) FLANGED SHIM FOR DISC BRAKE SQUEAL ATTENUATION

(75) Inventors: Ramana Kappagantu, Canton, MI (US); Eric Denys, Ann Arbor, MI (US)

(73) Assignee: Material Sciences Corporation, Elk Grove Village, IL (US)

( * ) Notice: Subject to any disclaimer, the term of this patent is extended or adjusted under 35 U.S.C. 154(b) by 443 days.

(21) Appl. No.: 12/367,110

(22) Filed: Feb. 6, 2009

(65) Prior Publication Data

US 2009/0223753 A1    Sep. 10, 2009

Related U.S. Application Data

(60) Provisional application No. 61/026,521, filed on Feb. 6, 2008.

(51) Int. Cl.
*F16D 69/00* (2006.01)
*F16D 65/04* (2006.01)

(52) U.S. Cl.
USPC ............. 188/250 D; 188/73.1; 188/73.36

(58) Field of Classification Search
USPC ............ 188/73.1, 73.36, 73.37, 73.38, 73.39, 188/251 R, 252, 251 A, 250 D, 250 B
See application file for complete search history.

(56) References Cited

U.S. PATENT DOCUMENTS

| | | |
|---|---|---|
| 4,027,752 A | 6/1977 | Brix |
| 4,155,430 A | 5/1979 | Kawamura |
| 4,722,424 A | 2/1988 | Ikeuchi |
| 4,836,339 A | 6/1989 | Kobayashi et al. |
| 4,995,482 A | 2/1991 | Kobayashi et al. |
| 5,332,067 A | 7/1994 | Prud'homme |
| 5,427,213 A | 6/1995 | Weiler et al. |
| 5,467,846 A | 11/1995 | Abe et al. |
| 6,056,091 A | 5/2000 | Krug et al. |
| 6,170,620 B1 | 1/2001 | Akita et al. |
| 6,298,956 B1 | 10/2001 | Gerhardt et al. |
| 2003/0221919 A1 | 12/2003 | Kumamoto et al. |
| 2005/0284710 A1 * | 12/2005 | Roberts et al. ............... 188/73.1 |

FOREIGN PATENT DOCUMENTS

| | | | |
|---|---|---|---|
| DE | 3402866 A1 * | 9/1984 | |
| EP | 138081 A1 * | 4/1985 | |
| JP | 56160437 A * | 12/1981 | |
| JP | 57174649 A * | 10/1982 | |
| JP | 2004148700 A * | 5/2004 | |

* cited by examiner

*Primary Examiner* — Melody Burch
(74) *Attorney, Agent, or Firm* — Berenato & White, LLC (57) ABSTRACT

A brake pad assembly provided for a disc brake apparatus. The brake pad assembly comprises a backing plate having a flat inner face and a flat outer face oriented opposite to the inner face, a friction member fixed to the inner face of the backing plate, and an anti-squeal shim attached to the outer face of the backing plate. The anti-squeal shim includes a flat support plate attached to the outer face of the backing plate and a straight flat flange plate. The support plate of the anti-squeal shim has a peripheral edge including opposite outer and inner edges and opposite side edges. The flange plate is in the form of a flexible cantilever formed integrally with the support plate of the anti-squeal shim and extends away from one of the outer, inner and opposite side edges of the support plate of the anti-squeal shim.

18 Claims, 7 Drawing Sheets

| Summary of Noisy Stops | | | | | |
|---|---|---|---|---|---|
| # of Stops = 1438/1438 | | Freq. 1 | Freq. 2 | Freq. 3 | Freq. 4 |
| dBA | % Occur | 2600-3200 | 8800-9200 | 7600-8000 | 8000-8400 |
| >=70 | 23.87 | 5.77 | 5.29 | 5.22 | 3.13 |
| >=80 | 17.87 | 2.43 | 4.38 | 4.31 | 1.39 |
| >=90 | 7.30 | 0.28 | 1.39 | 3.41 | |
| >=100 | 2.23 | | 0.07 | 1.81 | |
| | | | | | |
| | | | | | |
| Max SPL (dBA) | | 92.00 | 100.00 | 107.00 | 86.00 |
| Aver. SPL (dBA) | | 82.06 | 89.70 | 99.25 | 80.19 |

Fig. 7

| Summary of Noisy Stops | | | | | |
|---|---|---|---|---|---|
| # of Stops = 1436/1438 | | Freq. 1 | Freq. 2 | Freq. 3 | Freq. 4 |
| dBA | % Occur | 2800-3200 | 6000-6400 | 3600-4000 | 2000-2400 |
| >=70 | 6.27 | 1.74 | 1.60 | 1.25 | 0.56 |
| >=80 | 1.95 | 0.49 | 0.84 | 0.35 | 0.21 |
| >=90 | 0.14 | | | 0.07 | |
| >=100 | 0.00 | | | | |
| | | | | | |
| | | | | | |
| Max SPL (dBA) | | 88.00 | 89.00 | 92.00 | 85.00 |
| Aver. SPL (dBA) | | 79.41 | 81.75 | 81.56 | 80.59 |

Fig. 8

FLANGED SHIM FOR DISC BRAKE SQUEAL ATTENUATION

CROSS-REFERENCE TO RELATED APPLICATION

This Application claims the benefit under 35 U.S.C. 119(e) of U.S. Provisional Application Ser. No. 61/026,521 filed Feb. 6, 2008 by Kappagantu, R., which is hereby incorporated herein by reference in its entirety and to which priority is claimed.

BACKGROUND OF THE INVENTION

1. Field of the Invention

The present inventions relates to brake pad assemblies for disc brakes in general and more particularly to a shim structure of a disc brake pad assembly for sound damping brake squeal noise in a disc brake apparatus.

2. Description of the Prior Art

Conventionally, in a disc brake apparatus two opposite brake pad assemblies compress a brake rotor in order to decelerate or stop the rotation of the brake rotor. The typical disc brake pad assembly 1, illustrated in FIGS. 1A and 1B, consists of a friction pad 4 attached by bonding to a face of a steel backing plate 2, which gives the friction pad 4 necessary support to resist a pressure load from a brake piston and/or caliper.

Figure 1A:
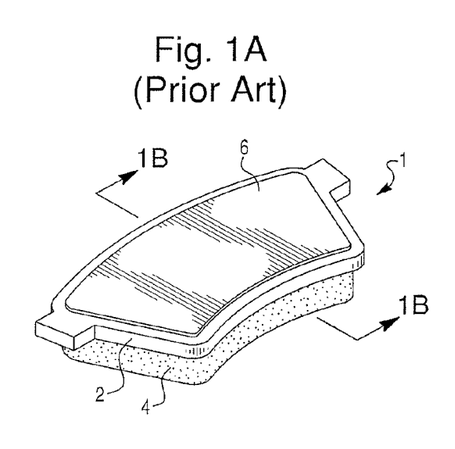
FIG. 1A is a perspective view of a conventional disc brake pad assembly.
Figure 1B:
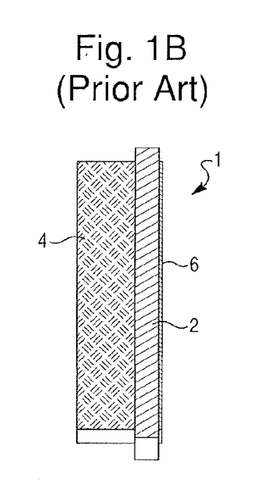
FIG. 1B is a cross-sectional view of the conventional disc brake pad assembly.

When the brake piston presses a back face of the backing plate 2 of the disc brake pad assembly 1 inwardly during the braking operation, an inner surface of the friction pad 4 is engaged in frictional, braking contact with the brake rotor of the disc brake apparatus. Such an action creates high operating temperatures of the disc brake apparatus (500 C.° or more) and high specific area pressures (about 1000 kg/cm$^2$) as the brake piston normally has a relatively small cross section. The friction between the brake rotor and the brake pad assembly generates vibration of the elements of the brake pad assembly during braking operation. As a result, unpleasant and often loud braking noise, particularly relatively high pitched and undesired brake "squeal" noise, frequently occurs during the braking operation.

Numerous solutions to the brake noise problem have been proposed, many of which rely on the principle of damping vibrations. One of the most common solutions known in the art is placing of a noise-damping shim 6 (as illustrated in FIGS. 1A and 1B) in the form of a plate-like piece having a vibration-damping characteristic, between the backing plate of the brake pad assembly and the piston or caliper of the disc brake apparatus.

While known solutions to the brake noise problem, including but not limited to the noise-damping shims discussed above, have proven to be acceptable for various disc brake applications, such devices are nevertheless susceptible to improvements that may enhance their performance, cost and packaging. With this in mind, a need exists to develop improved anti-squeal shims for the disc brake apparatuses that advance the art.

SUMMARY OF THE INVENTION

The present invention provides an improved brake pad assembly for a disc brake apparatus. The brake pad assembly comprises a backing plate having a flat inner face and a flat outer face oriented opposite to the inner face, a friction member having an outer face fixed to the inner face of the backing plate, and an anti-squeal shim attached to the outer face of the backing plate. The anti-squeal shim includes a flat support plate attached to the outer face of the backing plate and a straight flat flange plate. The support plate of the anti-squeal shim has an outer peripheral edge surrounding the support plate. The outer peripheral edge of the support plate includes opposite outer and inner edges and opposite side edges. The flange plate is in the form of a flexible cantilever formed integrally with the support plate and extends away from one of the outer, inner and opposite side edges of the support plate of the anti-squeal shim.

The anti-squeal shim of the brake pad assembly in accordance with the present invention substantially increases stiffness and energy dissipation of the brake pad assembly, and resulting vibration damping during the braking operation of the disc brake apparatus of the vehicle. Consequently, the brake pad assembly in accordance with the present invention allows for significant overall reduction of braking noise.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENT(S)

The preferred embodiment of the present invention will now be described with the reference to accompanying drawings.

For purposes of the following description, certain terminology is used in the following description for convenience only and is not limiting. The words "top", "bottom", "right", "left", "lower", "upper", "inner" and "outer" designate directions in the drawings to which reference is made. The words "uppermost" and "lowermost" refer to position in a vertical direction relative to a geometric center of the apparatus of the present invention and designated parts thereof. The terminology includes the words above specifically mentioned, derivatives thereof and words of similar import. Additionally, the word "a" as used in the claims means "at least one".

Figure 2:
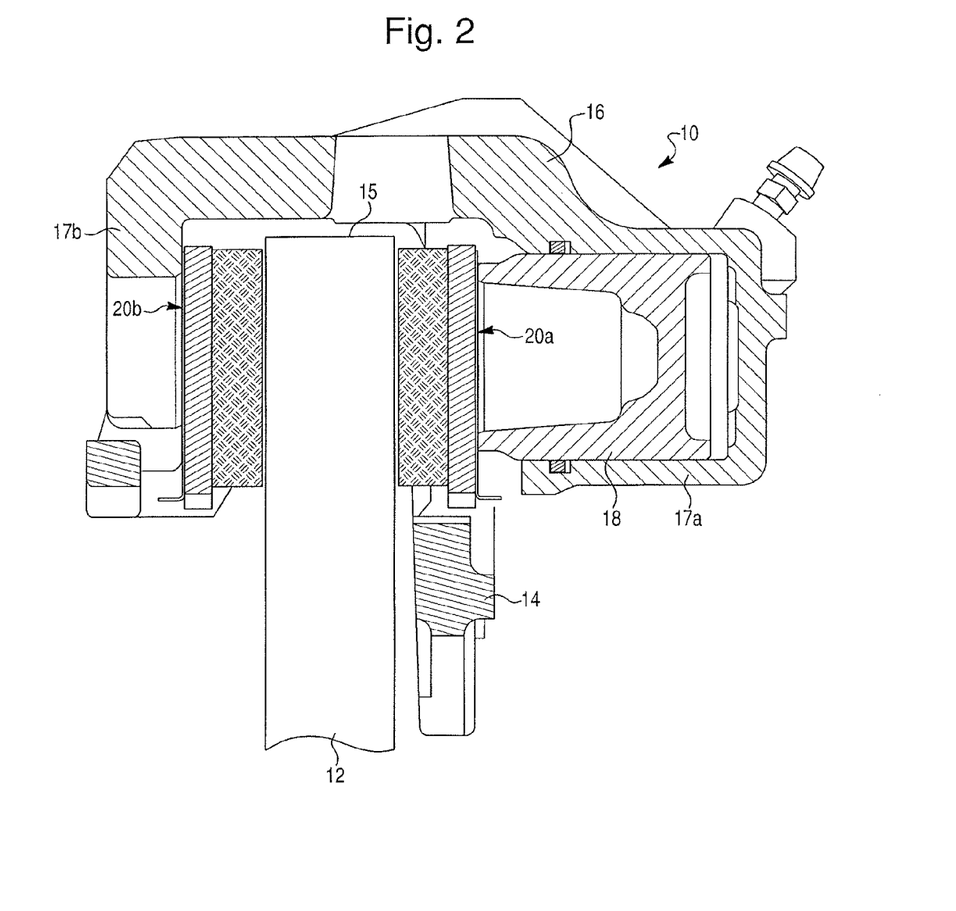
FIG. 2 is a fragmented cross-sectional view of a disc brake apparatus including brake pad assemblies in accordance with the first exemplary embodiment of the present invention.
Figure 3A:
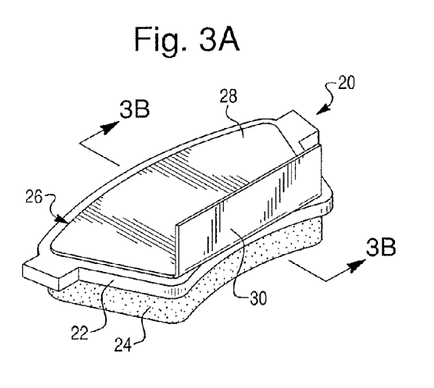
FIG. 3A is a perspective view of a brake pad assembly in accordance with the first exemplary embodiment of the present invention.
Figure 3B:
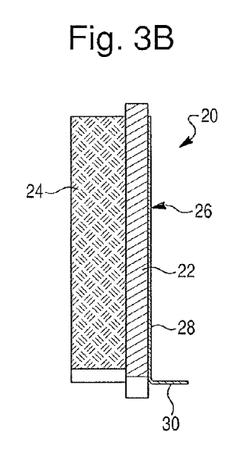
FIG. 3B is a cross-sectional view of the brake pad assembly in accordance with the first exemplary embodiment of the present invention taken along the line 3B-3B of FIG. 3A.
Figure 3C:
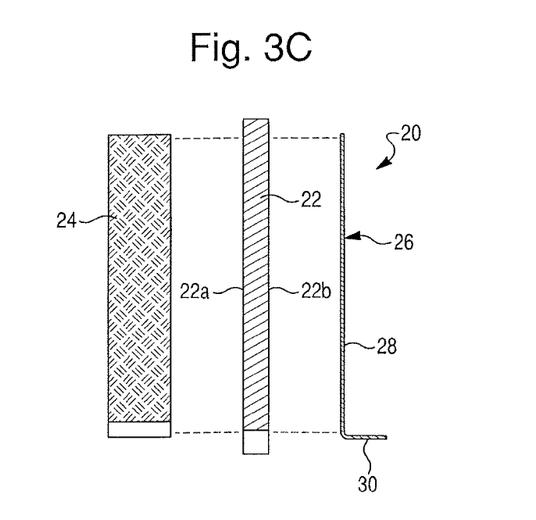
FIG. 3C is an exploded cross-sectional view of the brake pad assembly in accordance with the first exemplary embodiment of the present invention taken along the line 3B-3B of FIG. 3A.
Figure 3D:
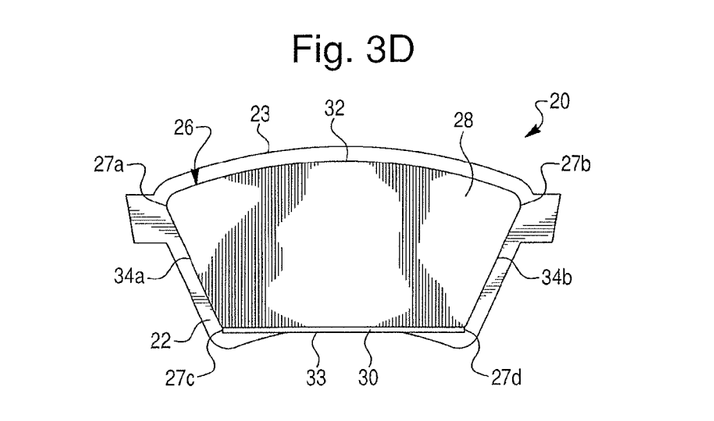
FIG. 3D is a side view of the brake pad assembly in accordance with the first exemplary embodiment of the present invention.

FIG. 2 of the drawings illustrates a disc brake apparatus, generally denoted by reference numeral 10, for a motor vehicle. The disc brake apparatus 10 includes a brake rotor 12 rotatably mounted to a brake support member 14, a movable caliper 16 also mounted to the brake support member 14 so as to straddle the brake rotor 12, and inner and outer brake pad assemblies 20a and 20b, respectively, slidably supported by the brake support member 14 so as to be movable over a predetermined distance in the axial direction of the brake rotor 12. The caliper 16 includes a cylinder portion 17a receiving a brake piston 18 therein, and a reaction arm 17b. Preferably, the caliper 16 is integrally formed as a single-piece such as by casting. It will be appreciated that the brake piston 18 is movable over a predetermined distance in the direction of an axis of rotation of the brake rotor 12. During the braking operation, when the brake piston 18 presses the inner brake pad assembly 20a inwardly into a braking contact with the brake rotor 12 of the disc brake apparatus 10, the outer brake pad assembly 20b is pressed and moved toward the brake rotor 12 by means of the reaction arm 17b of the movable caliper 16.

In view of the structural similarities of the inner and outer brake pad assemblies 20a and 20b, and in the interest of simplicity, the following discussion will use a reference numeral without a letter to designate an entire group of substantially identical structures. For example, the reference numeral 20 will be used when generically referring to the brake pad assemblies 20a and 20b rather than reciting all two reference numerals.

Although, the disc brake apparatus 10 illustrated in FIG. 2 is shown as using both inner and outer brake pad assemblies according to the present invention, it will be appreciated that only one of the inner and outer brake pad assemblies may be used according to the present invention.

FIGS. 3A-3D of the drawings illustrate in detail the first exemplary embodiment of the brake pad assembly 20 in accordance with the present invention, for use in the disc brake apparatus 10 of the motor vehicle. The brake pad assembly 20 comprises a backing plate 22 having a peripheral edge 23 (best shown in FIG. 3D) and a friction pad (or lining) 24 fixedly attached to an inner face 22a of the backing plate 22 (i.e. the side of the backing plate 22 facing the brake rotor 12 when mounted in the disc brake apparatus 10 as shown in FIG. 2) by any appropriate means known in the art, such as by adhesive bonding or with rivets, to define a brake pad. Preferably, the backing plate is made of steel, while the friction pad 24 is made of any appropriate friction material known in the art. Alternatively, any other appropriate composite or plastic materials may be used to make the backing plate 22.

The brake pad assembly 20 further comprises an anti-squeal (sound damping) shim 26 to reduce and/or to eliminate undesired brake squeal noise generated by the brake pad assembly 20 during the braking operation thereof. As illustrated in FIGS. 3A-3D, the anti-squeal shim 26 of the brake pad assembly 20 comprises a substantially flat support plate (or support portion) 28 in contact with the backing plate 22, and a straight, flat flange plate (or flange portion) 30 extending from the flat support plate 28 so as to be in the form of a flexible cantilever formed integrally with the support plate 28 of the anti-squeal shim 26. In other words, the straight flange plate 30 has a distal free edge 31 (shown in FIGS. 3A and 3B) axially spaced from the support plate 28. Preferably, the straight flange plate 30 of the anti-squeal shim 26 is perpendicular to the support plate 28 thereof and has a rectangular shape. Alternatively, the straight flange plate 30 can have any other appropriate shape. Dimensions of the flange plate 30, such as width and length) can be varied to achieve the desired frequency. As further illustrated in FIGS. 3A-3D, preferably, both the support plate 28 and the flange plate 30 are formed integrally from a single blank of shim material, such as steel. In other words, preferably, the anti-squeal shim 26 is formed as a single-piece part by stamping. It will be appreciated that the anti-squeal shim 26 can be made of any appropriate material, such as multilayer composite material. In the exemplary embodiment of the present invention, the anti-squeal shim 26 is made of a stainless steel plate coated on one face thereof with a layer of a heat resisting adhesive and with a layer of paint on the other face thereof.

The support plate 28 is fixedly attached to an outer face 22b of the backing plate 22 (i.e. the side of the backing plate 22 facing away from the brake rotor 12 when mounted in the disc brake apparatus 10 as shown in FIG. 2) by any appropriate means known in the art, such as by adhesive bonding or by riveting. In other words, the anti-squeal shim 26 is positioned (sandwiched) between the hydraulically actuated piston 18 of the disc brake apparatus 10 and the outer face 22b of the backing plate 22 of the brake pad assembly 20, or between the reaction arm 17b of the caliper 16 and the outer face 22b of the backing plate 22 of the associated brake pad assembly 20. Preferably, the straight flange plate 30 of the anti-squeal shim 26 extends from the flat support plate 28 of the anti-squeal shim 26 in the direction away from the backing plate 22. The anti-squeal shim 26 is flanged at the strategic edges of the flat support plate 28 thereof where there is little or no interference with the brake piston 18, the reaction arm 17b or other portions of the caliper 16. In other words, the flange plate 30 of the anti-squeal shim 26 is free, i.e. not in contact with any part of the disc brake apparatus 10.

The support plate 28 of the anti-squeal shim 26 has a peripheral edge having four vertices 27a, 27b, 27c and 27d, and including opposite outer and inner edges 32 and 33, respectively, and opposite side edges 34a and 34b. The term "outer peripheral edge of the support plate" as used herein refers to the edge 32 of the support plate 28 disposed closer to an outer peripheral edge 15 of the brake rotor 12 when the brake pad assembly 20 is installed in the disc brake apparatus 10, while the term "inner peripheral edge of the support plate" refers to the edge 33 of the support plate 28 farthest from the outer peripheral edge 15 of the brake rotor 12 when the brake pad assembly 20 is installed in the disc brake apparatus 10. It is to be understood that the term "opposite side edges" refers to the edges 34a and 34b of the support plate 28 disposed between the opposite outer and inner edges 32, 33 thereof. In other words, the outer edge 32 extends between the vertices 27a and 27b, the inner edge 33 extends between the vertices 27c and 27d, and the opposite side edges 34a and 34b extend between the vertices 27a-27c and 27b-27d, respectively.

As further illustrated in FIGS. 3A-3D, the vertices 27a, 27b, 27c and 27d of the support plate 28 of the anti-squeal shim 26 are disposed (located) on the outer face 22b of the backing plate 22 within the peripheral edge 23 thereof. In other words, preferably, the vertices 27a, 27b, 27c and 27d of the support plate 28 of the anti-squeal shim 26 do not extend beyond the peripheral edge 23 of the backing plate 22. Preferably, as illustrated in FIGS. 2 and 3A-3D, the straight flange plate 30 extends from the inner edge 33 of the support plate 28 of the anti-squeal shim 26. Thus, the inner edge 33 of the support plate 28 is in the form of the straight line extending between the vertices 27c and 27d.

Figure 4A:
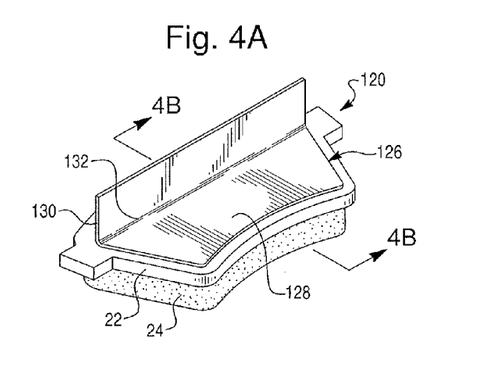
FIG. 4A is a perspective view of the brake pad assembly in accordance with the second exemplary embodiment of the present invention.
Figure 4B:
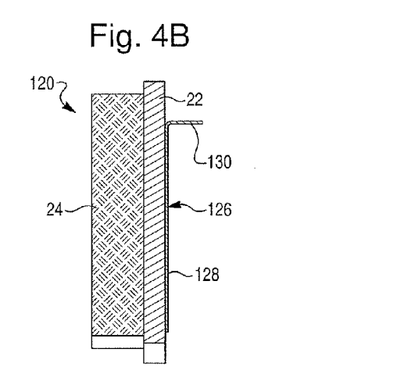
FIG. 4B is a cross-sectional view of the brake pad assembly in accordance with the second exemplary embodiment of the present invention taken along the line 4B-4B of FIG. 4A.

FIGS. 4A-4B illustrate a second exemplary embodiment of a brake pad assembly of the present invention, generally depicted by the reference character 120. Components, which are unchanged from the previous exemplary embodiment of the present invention, are labeled with the same reference characters. Components, which function in the same way as in the first exemplary embodiment of the present invention depicted in FIGS. 2 and 3A-3D are designated by the same reference numerals to which 100 has been added, sometimes without being described in detail since similarities between the corresponding parts in the two embodiments will be readily perceived by the reader. The brake pad assembly 120 of FIGS. 4A-4B corresponds substantially to the brake pad assembly 20 of FIGS. 2 and 3A-3D, and only an anti-squeal shim 126 of the brake pad assembly 120 differs. Specifically, a straight flange plate 130 of the anti-squeal shim 126 extends from an outer edge 132 of a support plate 128 of the anti-squeal shim 126 of the brake pad assembly 120 according to the second exemplary embodiment of the present invention, as illustrated in FIGS. 4A and 4B. Consequently, the outer edge 132 of the support plate 128 is in the form of the straight line extending between the corresponding vertices of a peripheral edge of the support plate 128.

Figure 5A:
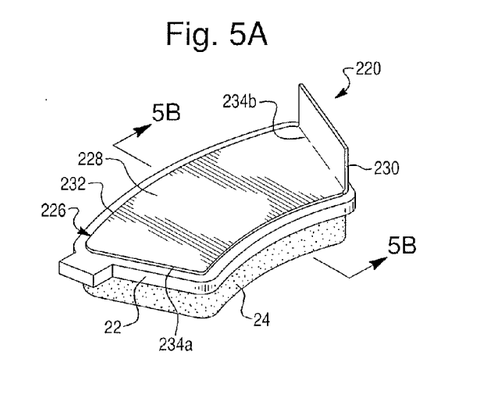
FIG. 5A is a perspective view of a brake pad assembly in accordance with the third exemplary embodiment of the present invention.
Figure 5B:
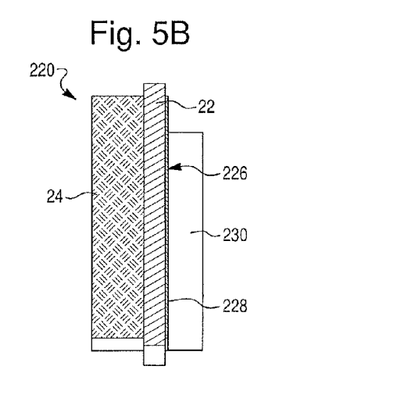
FIG. 5B is a cross-sectional view of the brake pad assembly in accordance with the third exemplary embodiment of the present invention taken along the line 5B-5B of FIG. 5A.

FIGS. 5A-5B illustrate a third exemplary embodiment of a brake pad assembly of the present invention, generally depicted by the reference character 220. Components, which are unchanged from the previous exemplary embodiment of the present invention, are labeled with the same reference characters. Components, which function in the same way as in the first exemplary embodiment of the present invention depicted in FIGS. 2 and 3A-3D are designated by the same reference numerals to which 200 has been added, sometimes without being described in detail since similarities between the corresponding parts in the two embodiments will be readily perceived by the reader. The brake pad assembly 220 of FIGS. 5A-5B corresponds substantially to the brake pad assembly 20 of FIGS. 2 and 3A-3D, and only an anti-squeal shim 226 of the brake pad assembly 220 differs. Specifically, a straight flange plate 230 of the anti-squeal shim 226 extends from a side edge 234b of a support plate 228 of the anti-squeal shim 226 of the brake pad assembly 220 according to the third exemplary embodiment of the present invention, as illustrated in FIGS. 5A and 5B. In fact, the straight flange plate 230 can extend from any of the side edges 234a, 234b of the support plate 228 of the anti-squeal shim 226 according to the third exemplary embodiment of the present invention. Consequently, any of the side edges 234a, 234b of the support plate 228 from which the straight flange plate 230 extends, is in the form of the straight line extending between the corresponding vertices of a peripheral edge of the support plate 228.

Figure 8:
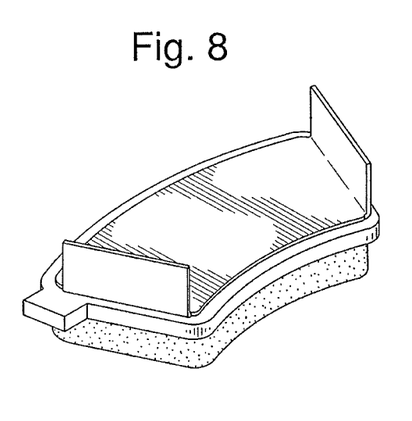
FIG. 8 is a perspective view of a brake pad assembly in accordance with a fourth exemplary embodiment of the present invention.

Thus, any edge of the support plate (28, 128 or 228) of the anti-squeal shim (26, 126 or 226), from which the straight flange plate (30, 130 or 230) extends, is in the form of the straight line extending between the corresponding vertices of the peripheral edge of the support plate (28, 128, or 228). Moreover, the anti-squeal shim (26, 126 or 226) according to the present invention may be provided with more than one straight flange plate (30, 130 or 230) extending from any of the outer, inner or side edges of the support plate in any possible combinations. For example, the anti-squeal shim 26 may have two straight flange plates 30 including one extending from the inner edge 33 of the support plate 28 and one extending from the outer edge 32 thereof. In other words, any combination of two, three or four straight flange plates 30 is within the scope of the present invention. FIG. 8 is a fourth embodiment showing a combination of two flange plates. However, in any such case, the anti-squeal shim 26 is flanged only when there is little or no interference with the brake piston any part of the disc brake apparatus 10.

Preferably, as illustrated in FIGS. 3A-5B, the straight flange plate (30, 130 or 230) extends outwardly from the flat support plate (28, 128, or 228) of the anti-squeal shim (26, 126 or 226) in the direction away from the backing plate 22. Further preferably, the flange plate (30, 130 or 230) is located as close as possible to the peripheral edge 23 of the backing plate 22 so that the shim area in contact with the backing plate 22 (i.e. the area of the support plate (28, 128, or 228)) is maximized in order to achieve maximum damping. Further preferably, the flange plate (30, 130 or 230) extends substantially along an entire length of the corresponding edge of the support plate (28, 128, or 228) of the anti-squeal shim (26, 126 or 226).

Figure 6:
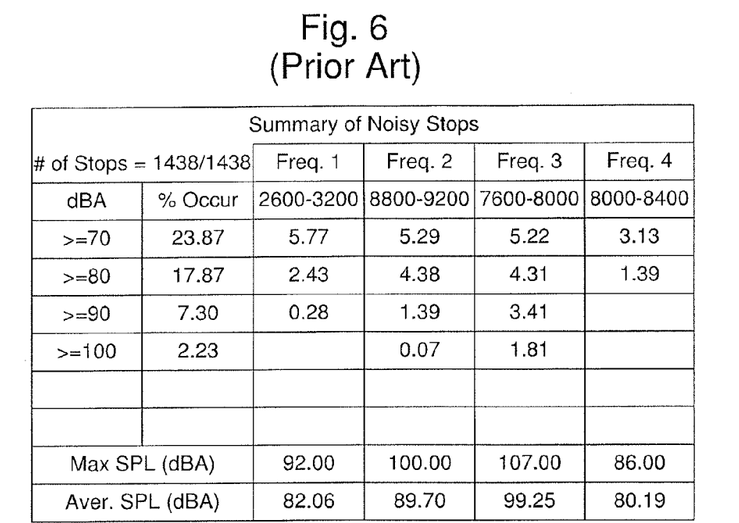
FIG. 6 is a table of test results for a conventional brake pad assembly.
Figure 7:
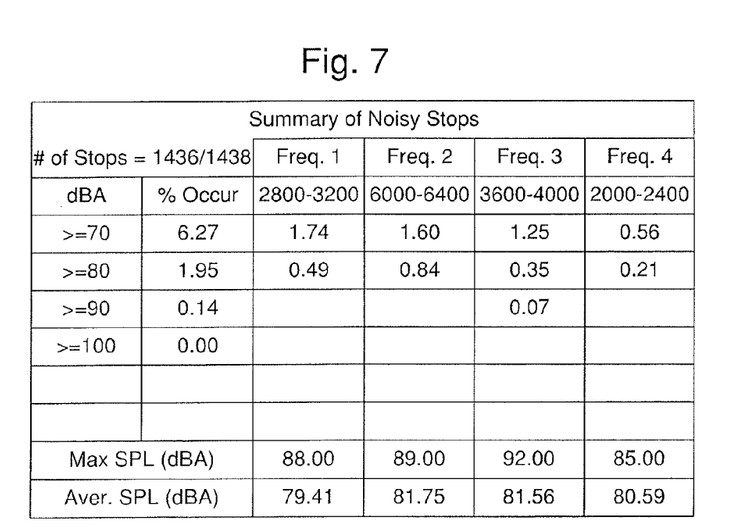
FIG. 7 is a table of test results for the brake pad assembly in accordance with the first exemplary embodiment of the present invention.

As the brake squeal noise is produced by vibration of the brake pad assembly 20 during braking actuation, forming the straight flange plate 30 on the anti-squeal (sound damping) shim 26 has a twofold effect: first, the flange shape changes the stiffness of the brake pad assembly 20, thus altering modal alignment with respect to squeal rotor modes; and second, the straight flange plate 30 increases the energy dissipation and resulting damping at modes of interest. As a result, the brake pad assembly in accordance with the present invention allows for overall reduction of noise from 28% to 6%, as illustrated in FIGS. 6 and 7.

Therefore, the novel anti-squeal shim of the brake pad assembly in accordance with the present invention substantially increases stiffness and energy dissipation of the brake pad assembly, and resulting vibration damping during the braking operation of the disc brake apparatus of the vehicle. Consequently, the brake pad assembly in accordance with the present invention allows for significant overall reduction of braking noise.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A brake pad assembly for a disc brake apparatus, said brake pad assembly comprising:
   a backing plate having an inner face and an outer face oriented opposite to said inner face;
   a friction member having an outer face that faces and is fixed to said inner face of said backing plate; and
   an anti-squeal shim immovably attached to said outer face of said backing plate;

said anti-squeal shim including a support plate attached to said outer face of said backing plate and a straight flat flange plate;

said support plate of said anti-squeal shim having an outer peripheral edge surrounding said support plate, said outer peripheral edge of said support plate including opposite outer and inner edges;

said flange plate being in the form of a flexible cantilever formed integrally with said support plate of said anti-squeal shim and extending from an entire length of an edge selected from the group consisting of said outer, inner and opposite side edges of said support plate of said anti-squeal shim in a direction perpendicularly away from said outer face of said friction member.

2. The brake pad assembly as defined in claim 1, wherein both said support plate and said flange plate are formed integrally from a single blank of a shim material.

3. The brake pad assembly as defined in claim 2, wherein said shim material is a multi-layer composite material.

4. The brake pad assembly as defined in claim 3, wherein said multi-layer composite material includes a stainless steel plate coated with a layer of adhesive on one face thereof and with a layer of paint on the other face thereof.

5. The brake pad assembly as defined in claim 1, wherein one of said outer, inner and opposite side edges of said support plate of said anti-squeal shim from which said flange plate extends is formed as a straight line.

6. The brake pad assembly as defined in claim 5, wherein said flange plate of said anti-squeal shim comprises a first flange plate, and wherein said anti-squeal shim comprises a second flange plate extending along an entire length of another edge selected from the group consisting of said outer, inner and opposite side edges of said support plate of said anti-squeal shim.

7. The brake pad assembly as defined in claim 5, wherein said flange plate extends along said inner edge of said support plate of said anti-squeal shim.

8. The brake pad assembly as defined in claim 5, wherein said flange plate extends along said outer edge of said support plate of said anti-squeal shim.

9. The brake pad assembly as defined in claim 1, wherein vertices of said outer peripheral edge of said support plate of said anti-squeal shim are located on said outer face of said backing plate within an outer peripheral edge of said backing plate so as to not extend beyond said outer peripheral edge of said backing plate.

10. A disc brake apparatus comprising:
a brake support member;
a brake rotor;
a brake pad assembly slidably supported by said brake support member so as to be movable over a predetermined distance in the axial direction of said brake rotor;
a caliper straddling said brake rotor and slidably mounted to said brake support member to allow sliding in the axial direction of the brake rotor, said caliper having a cylinder formed therein; and
a piston slidably mounted in said cylinder of said caliper to allow sliding in the axial direction of said brake rotor, said piston facing said brake pad assembly at a side thereof remote from said brake rotor;
said brake pad assembly comprising:
a backing plate having a flat inner face facing said brake rotor and a flat outer face oriented opposite to said inner face and facing said piston;
a friction member fixed to said inner face of said backing plate; and
an anti-squeal shim immovably attached to said outer face of said backing plate;
said anti-squeal shim including a flat support plate attached to said outer face of said backing plate and a straight flat flange plate;
said support plate of said anti-squeal shim having an outer peripheral edge surrounding said support plate, said outer peripheral edge of said support plate including opposite outer and inner edges and opposite side edges;
said flange plate being in the form of a flexible cantilever formed integrally with said support plate of said anti-squeal shim and extending from an entire length of an edge selected from the group consisting of said outer, inner and opposite side edges of said support plate of said anti-squeal shim in a direction perpendicularly away from the outer face of the backing plate and a face of said brake rotor that faces the backing plate;
said flange plate of said anti-squeal shim spaced from said brake support member, said caliper and said piston.

11. The brake pad assembly as defined in claim 10, wherein both said support plate and said flange plate are formed integrally from a single blank of a shim material.

12. The brake pad assembly as defined in claim 10, wherein one of said outer, inner and opposite side edges of said support plate of said anti-squeal shim from which said flange plate extends is formed as a straight line.

13. The brake pad assembly as defined in claim 12, wherein said flange plate extends along said inner edge of said support plate of said anti-squeal shim.

14. The brake pad assembly as defined in claim 12, wherein said flange plate extends along said outer edge of said support plate of said anti-squeal shim.

15. The brake pad assembly as defined in claim 12, wherein said flange plate extends along one of said opposite side edges of said support plate of said anti-squeal shim.

16. The brake pad assembly as defined in claim 10, wherein vertices of said outer peripheral edge of said support plate of said anti-squeal shim are located on said outer face of said backing plate within an outer peripheral edge of said backing plate so as to not extend beyond said outer peripheral edge of said backing plate.

17. A brake pad assembly for a disc brake apparatus, said brake pad assembly comprising:
a backing plate having an inner face and an outer face oriented opposite to said inner face;
a friction member having an outer face that faces and is fixed to said inner face of said backing plate; and
an anti-squeal shim immovably attached to said outer face of said backing plate;
said anti-squeal shim including a support plate attached to said outer face of said backing plate and a straight flat flange plate;
said support plate of said anti-squeal shim having an outer peripheral edge surrounding said support plate, said outer peripheral edge of said support plate including opposite outer and inner edges and opposite side edges, wherein said outer peripheral edge of said support plate of said anti-squeal shim is located on said outer face of said backing plate within an outer peripheral edge of said backing plate so as to not extend beyond said outer peripheral edge of said backing plate;
said flange plate being in the form of a flexible cantilever formed integrally with said support plate of said anti-squeal shim and extending from an entire length of an edge selected from the group consisting of said outer, inner and opposite side edges of said support plate of said anti-squeal shim.

18. The brake pad assembly as defined in claim 17, wherein said flange plate extends away from one of said outer, inner and opposite side edges of said support plate of said anti-squeal shim in a direction perpendicularly away from said outer face of said friction member.

\* \* \* \* \*